United States Patent [19]
Miyashita et al.

[11] Patent Number: 5,894,942
[45] Date of Patent: Apr. 20, 1999

[54] GRAVITY FEED FLOW-RACK APPARATUS

[75] Inventors: Muneharu Miyashita; Masuo Shimura, both of Inuyama, Japan

[73] Assignee: Yazaki Industrial Chemical Co Ltd., Shizuoka-ken, Japan

[21] Appl. No.: 08/864,447

[22] Filed: May 28, 1997

[51] Int. Cl.[6] .................................................. A47F 1/04
[52] U.S. Cl. ................. 211/59.2; 211/175; 108/147.12; 108/180; 221/242; 221/289; 221/295
[58] Field of Search ........................ 211/59.2, 59.3, 211/175; 108/147.12, 180; 221/295, 289, 242

[56] References Cited

U.S. PATENT DOCUMENTS

| | | | |
|---|---|---|---|
| 1,707,576 | 4/1929 | Schubert | 211/175 X |
| 2,353,394 | 7/1944 | Farmer | 211/59.2 |
| 3,055,293 | 9/1962 | Lariccia | 211/59.2 X |
| 3,746,176 | 7/1973 | Kotlar | 211/175 X |
| 3,970,216 | 7/1976 | Rainey | 221/295 X |
| 4,416,380 | 11/1983 | Flum | 211/59.2 |
| 4,426,008 | 1/1984 | Olson et al. | 211/59.2 |
| 5,201,429 | 4/1993 | Hikosaka et al. | 211/59.2 |
| 5,279,430 | 1/1994 | Benton | 211/59.2 X |
| 5,645,182 | 7/1997 | Miller, Jr. et al. | 211/175 X |

FOREIGN PATENT DOCUMENTS

| | | | |
|---|---|---|---|
| 2445711 | 9/1980 | France | 211/175 |
| 20804 | 5/1992 | Japan . | |

*Primary Examiner*—Blair M. Johnson
*Attorney, Agent, or Firm*—Eric P. Schellin

[57] ABSTRACT

A gravity-feed flow rack apparatus for multiple articles with rack modules arranged vertically.

The rack apparatus include main module, front and rear auxiliary modules having article conveyance skid rails, insert joint for joining said modules, tiltable stopper means for serially advancing articles on said module, and control means performing control of desired operation condition of the rack apparatus.

The rack apparatus may be a constructionally changeable in desired number and spaces of the rack modules in which flexible change is desired.

15 Claims, 13 Drawing Sheets

GRAVITY FEED FLOW-RACK APPARATUS

BACKGROUND OF THE INVENTION

1). Field of the Invention

The present invention relates to a gravity-feed flow rack apparatus in automobile and electric industries, and more particularly to a rack apparatus for providing modular construction which is typically arranged in vertically multi-stage arrangement.

2). Description of the Prior Art

Heretofore, various rack apparatuses have been proposed which are typically configured in fixed frame and carrier rack construction, such as that of Japan Utility Model Publication No. 20804/1992, and others.

The apparatus includes plurality of carrier rack is provided in vertical multi-stages to a side frame, a carrier frame adapted to move an article stored thereon is of inclination forward to engage to carrier rack, and a stopper plate at front end thereof for receiving article.

A slide base having a stopper plate and a first actuation means at front end and lower rear end is arranged under each carrier rack, and a piston rod end of the first actuation means is secured by a bracket member fixed under each carrier rack, a stopper means having a sloped surface is integrally, oppositely affixed to a lower position of the carrier rack. A link arm linkages using a second actuation mean for lifting a following article on the carrier frame at a front bottom thereof is provided behind a bracket member.

A first-in article onto the carrier frame is allowed to slide down forwardly to the slide base by an actuation of the first actuation means, and the following article which slides down onto the carrier frame allowed with a prevention to slide down between the stopper means and the link arm lifting by an actuation of the second actuation means.

Such apparatus appears inconvenient in that the construction must be flexibly changeable to adapt to permit the storing and dispensing of different size articles so that it suits the needs of the user.

When a frequent change of the article's kind and size are required, unused spaces of the carrier rack and the dispensing port may still remain in same place because of the constructional change of the carrier rack of the apparatus has a disadvantages of an excess labor and time.

A problem with such apparatus incorporating such unused space of the carrier rack and dispensing port is its lower workability and productivity.

Although such apparatus have helped to achieve dispensing of articles easily by providing the slide base at the apparatus front ends, there appears to be a vertical surface of the frame rear ends, the effect of which is inconvenient with regard to the loading activity of articles.

Such apparatus provides the rack frame forming of a square shaped construction and the stopper plate of the slide base form a sharp angle, thereby a problem may occur as a work man engages the apparatus may risk injury, and result in lower productivity.

Further, the apparatus includes a stopper means, link arm linkages using the second actuation means for preventing the following article advances, the providing a limit switch detecting the articles presentation incorporated with the actuation means. Therefore, a problem with the apparatus is their structural complexity, and difficult to affect cost saving.

To regulate serially advancing articles, the apparatus includes a control unit for regulating the slide base movement, and allows advancing the next following articles by pressing a push button after dispensing first articles from the apparatus front ends. Such a device however has proven ineffective and operability to use.

Still further, is the use of a constant inclined carrier frame such that it facilitates the article to slide downwardly.

Unfortunately, differences in flow properties of utilized articles results in operation thereof in a different flow rate.

The present invention has been proposed to eliminate the above-mentioned drawbacks of conventional rack apparatus.

SUMMARY OF THE INVENTION

The present invention is directed generally to provide gravity-feed flow-rack apparatus for storing, conveying and dispensing articles.

It is an object of the present invention to provide a modular construction with rack modules capable of construction change to maintain the stored articles in vertically multi-stage relation, that is, effective in utilizing a rack space and enhancing article storage and operation efficiency, permitted for storing and dispensing different sizes of articles as desired by the user.

It is another object of the present invention to provide the rack modules with changeable transverse widths thereof.

It is a further object of the present invention to provide the rack modules that permits easily and safety in operation for loading and dispensing of the articles, and yet maintain attractiveness in appearance thereof.

It is still another object of the present invention to provide a means of a tiltable stopper for preventing the following article to advance to first-in article so as to facilitate easy dispensing the first-in article, with easy construction at less cost.

It is yet another object of the present invention to provide a rack module that may be controlled automatically, with movement of the articles mounted on the module.

It is another object of the present invention to provide a rack module which is capable of a constant article flow rate in spite of different flow properties of utilized articles, and provides the good workability thereof.

These and other objects and advantages of the present invention will become apparent from a review of the accompanying drawings and detailed description of the drawings.

DETAILED DESCRIPTION OF THE PREFERRED EMBODIMENT

Figure 1:
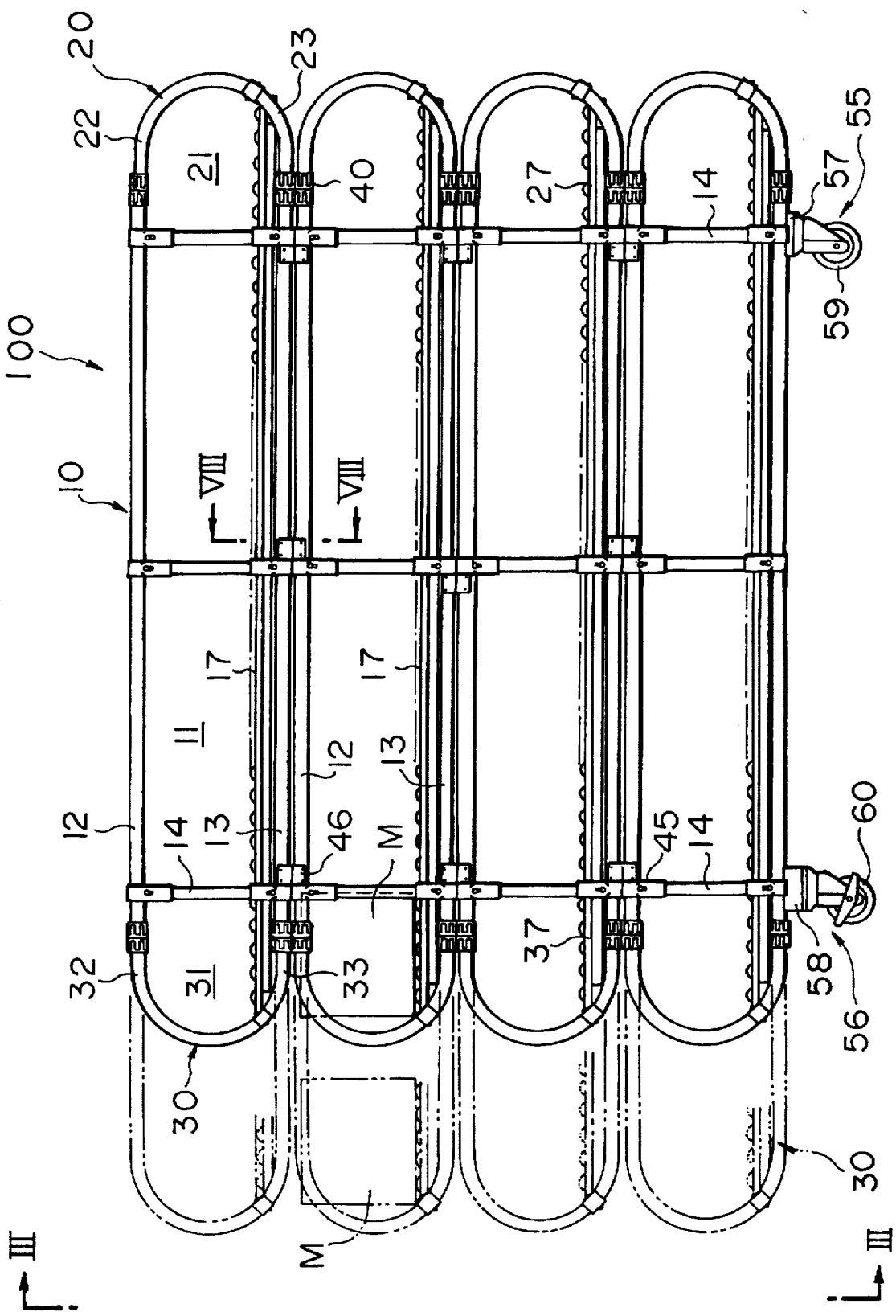
FIG. 1 is a side elevational view of a gravity-feed flow-rack apparatus showing one embodiment of the present invention.

Referring now to the drawing and first to FIGS. 1–4, a gravity-feed flow-rack apparatus of the present invention, being generally referred to by the numeral 100, respectively, is shown, wherein the rack apparatus 100 is capable of storing, conveying and dispensing a plurality of articles. One such article is shown in FIG. 1 at M in broken lines.

The rack apparatus 100 is provided with a plurality of rack modules illustrated generally at 50 (FIG. 4) which are disposed in a modular construction in a vertically multi-level relation.

Figure 3:
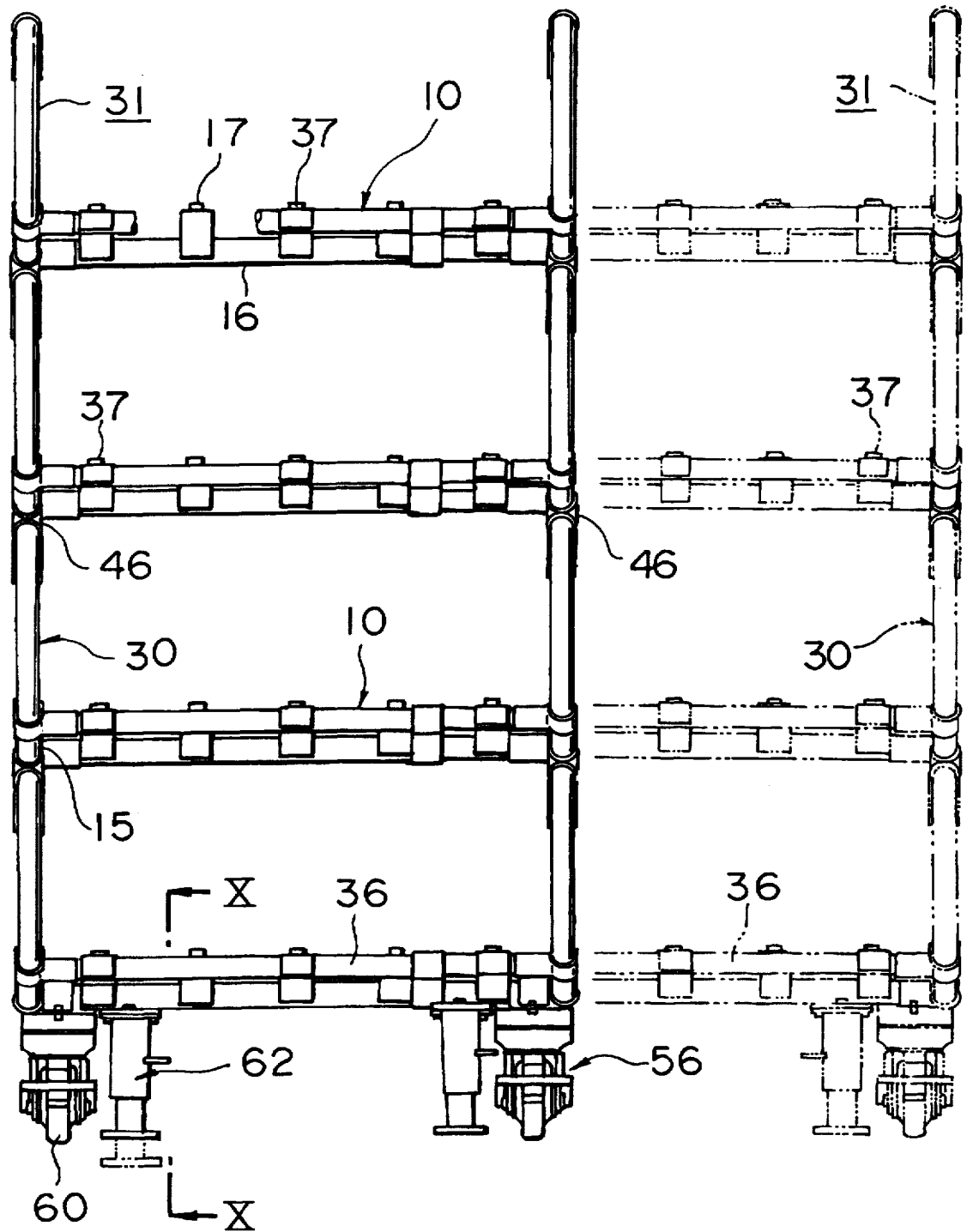
FIG. 3 is a rear elevational view taken along line III—III of FIG. 1 and illustrates the rear portion of the same.

For support of the rack apparatus 100 in a forward inclined position shown in FIGS. 1 and 3, support member 55 and 56 are respectively provided with a mount different thickness pads 57 and 58, and caster units 59 and 60 which extend to a suitable height.

Figure 4:
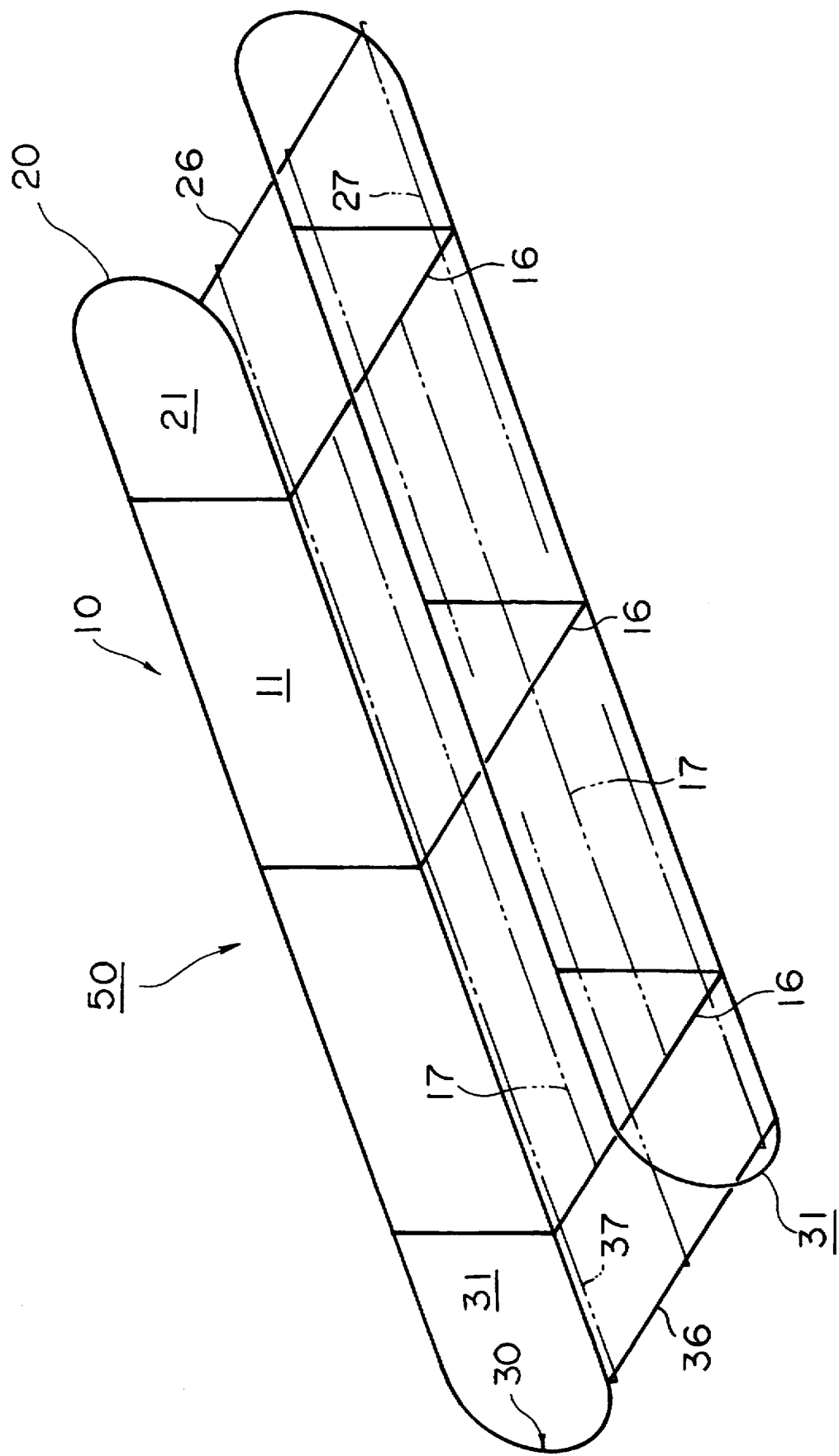
FIG. 4 is a fragmentary perspective schematic view which illustrate a modular configuration of the same.
Figure 7:
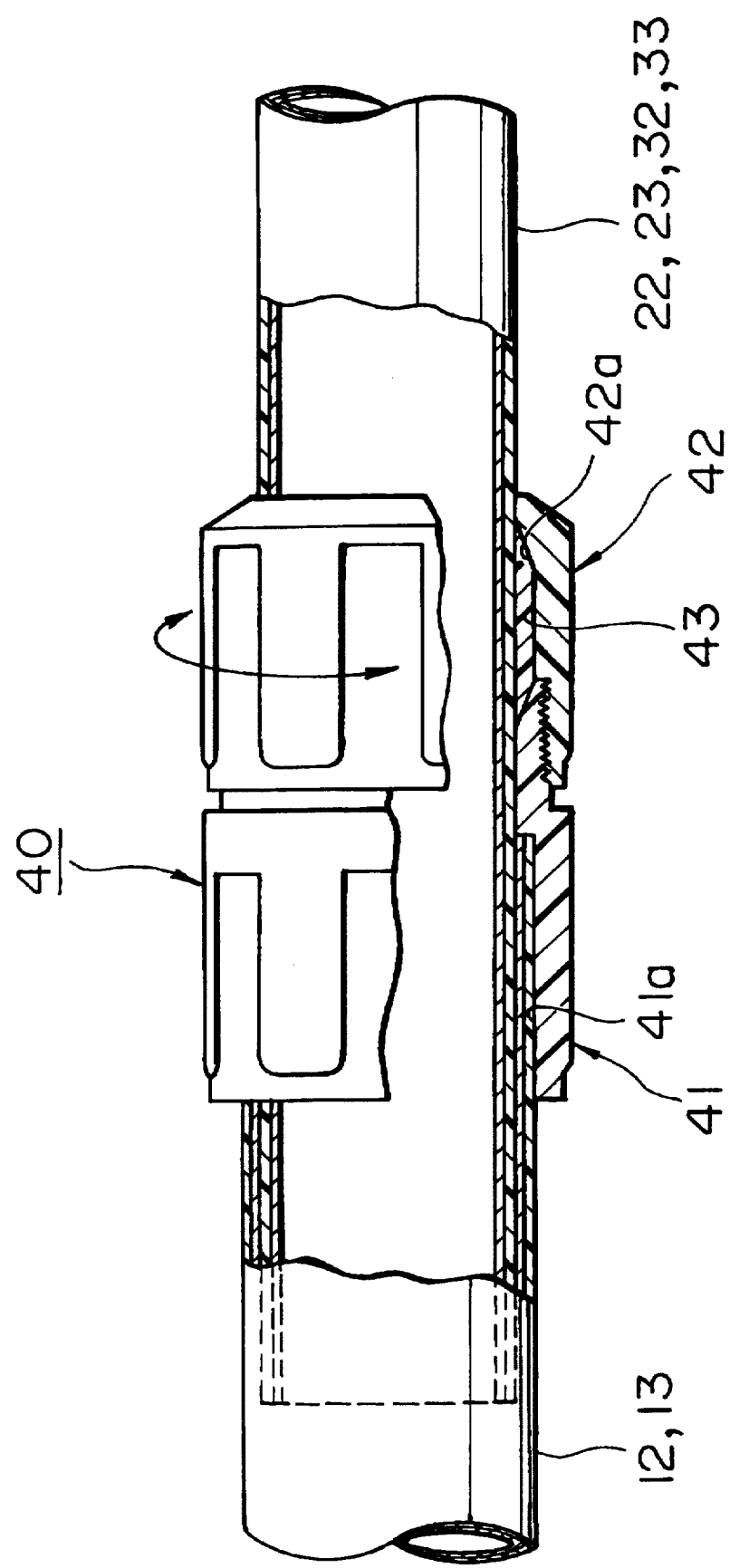
FIG. 7 is a fragmentary, cross sectional view of an insert joint of the present invention taken along line VII—VII of FIG. 5.

The rack module 50, seen in FIG. 4, is mainly provided with a main module 10, a front auxiliary module 20 and a rear auxiliary module 30, and the main module 10 extends longitudinally of the rack module 50 and is disposed between the front and rear auxiliary modules 20 and 30, with a connecting insert joint 40, as shown in FIG. 7. It allows insertion of respective front and rear auxiliary module 20 and 30, which are slidable longitudinally for length variation of the rack module 50 is thereby permitted.

The main module 10 is arranged to provide a pair of side frames 11 at both sides thereof, each of which extend longitudinally of the main module 10, and a plurality of main cross beams 16 are transversely disposed between the pair of side frames 11.

Each of the side frame 11 have an upper and a lower section 12 and 13. The upper and lower section 12 and 13 are disposed in parallel relation with one another, and a plurality of vertical column sections 14 are interposed between the upper and lower sections 12 and 13 with respective ends thereof secured using a T-shaped joint member 45 for attachment of the upper and lower sections 12 and 13.

As best illustrated in FIGS. 1 and 4, each side frame 11 may be preferably arranged in a rectangular shape.

The side frame 11 made of metal pipe, which is approximately 32 mm in external diameter and made by sheathing thin-wall steel pipe, which has a circular shape with a thin, uniform colored plastic resin material for example, of blue color, such as ASA (Acrylate Styrene Acrylonitrile copolymer) in order to make it light-weight and rust proof.

The front and rear auxiliary module 20 and 30 are arranged to provide, respectively, a pair of front and rear side frames 21 and 31 at both sides thereof.

A front and rear cross beam 26 and 36 are transversely disposed between the pair of front and rear side frames 21 and 31 respectively.

The front and rear side frames 21 and 31 are formed of U-shaped tubes which is approximately 28 mm in external diameter and made by sheathing thin-wall steel pipe, that is substantially similar to the construction of the side frame 11.

Both ends of the upper and lower section 12 and 13 have an joint ends for engagement with an insert joint 40 which can be joined respectively with the upper and lower section 22 and 23, and 32 and 33 of the front and rear side frame 21 and 31.

The insert joint 40 is shown by FIG. 7.

The insert joint 40 is composed of a socket end 41, a cap end 42 and a joint ring 43.

The insert joint 40 serves to allow releasable joining of the front and rear auxiliary module 20 and 30 with the main module 10.

The socket end 41 provided with its socket portion 41a at the interior of the above socket end 41, facilitates inserting of the upper and lower section 12 and 13 of the side frames 11, 11 within specific size limits between them.

In order to achieve insertion the outside diameter of the upper and lower section 22 and 23, and 32 and 33 within the upper and lower section 12 and 13, each inside diameter of the upper and lower section 12 and 13 are larger than the above outside diameter of the upper and lower sections 22 and 23, and 32 and 33.

The socket end 41 terminates axially in a threaded end portion.

An annular joint ring 43 having a longitudinal slit cut is spaced within a locking chamber 42a that is formed inside the cap end 42.

Further, the insert joint 40 serves to allow a releasable joining of each the upper and lower sections 11 and 13 of the side frame 11 to each of the upper and lower section 22 and 23, and 32 and 33 of the front and rear side frames 21 and 31, and rigidly secured to respective of above sections so that a force of wedge action of the joint ring 43 is applied thereto due to tighten up on the cap end 42.

The invention contemplates the variation of the effective length of the rack module 50 because of a length variation possible in each of the front and rear auxiliary module 20 and 30 so that it can be easily inserted telescopically into the main module 10 through the insert joint 40.

In other word, each of the front and rear auxiliary module 20 and 30 may be positioned at a desired position so that it is effective for loading or dispensing articles.

Figure 2:
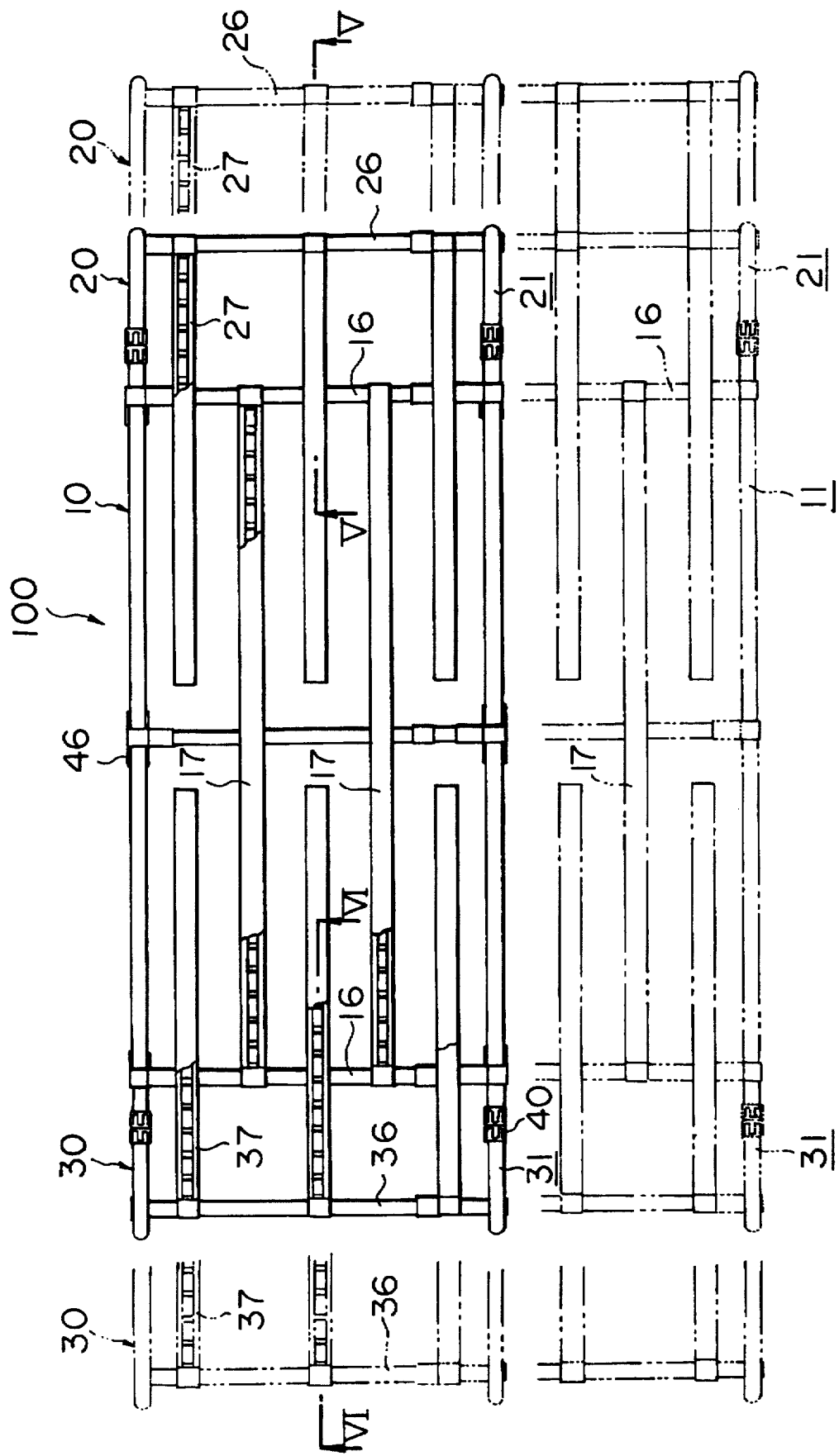
FIG. 2 is a top plan view of the same of FIG. 1.
Figure 5:
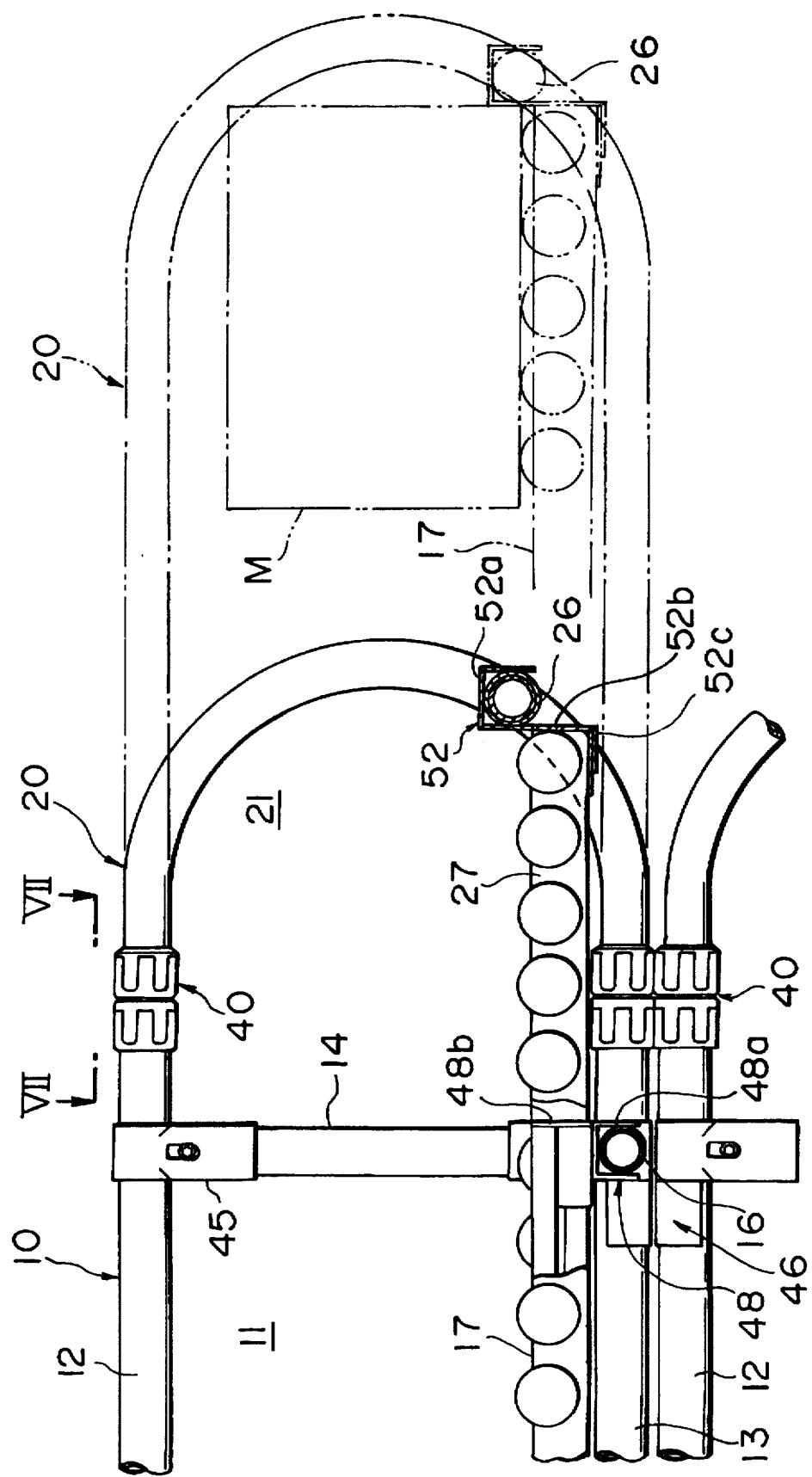
FIG. 5 is an enlarged fragmentary side elevational view of the present invention taken along line V—V of FIG. 2.
Figure 6:
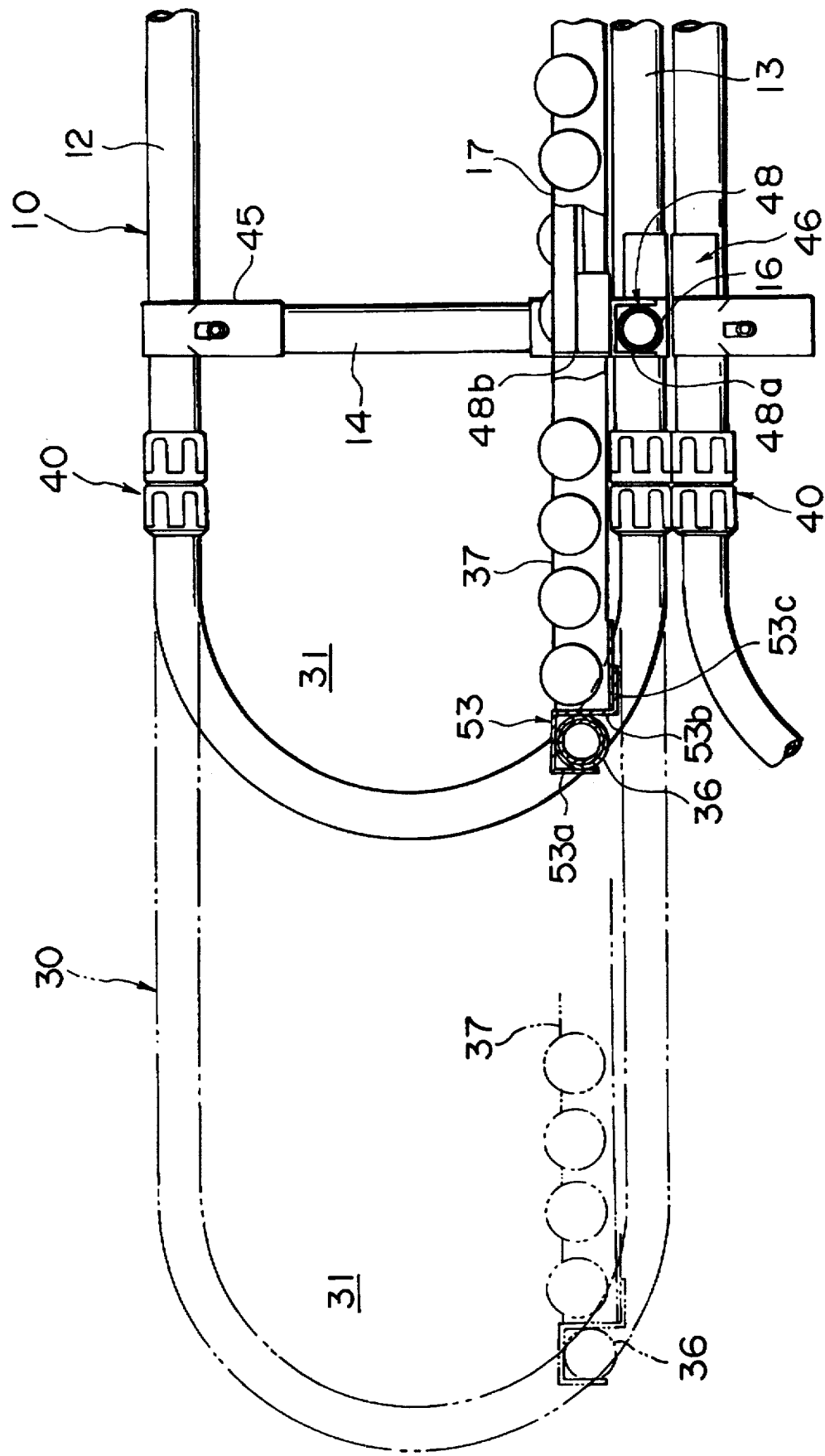
FIG. 6 is an enlarged fragmentary side elevational view of the present invention taken along line VI—VI of FIG. 2.

Referring to FIGS. 2, 5, 6, the length variation in each of the front and rear auxiliary module 20 and 30 are shown by dotted lines.

In FIGS. 1–4, each main module 10 depicts a plurality of elongated main skid rails 17 which fixed on each main cross beam 16. Each main skid rail 17 is located between adjacent pairs of the side frame 11, and are horizontally spaced at a desired distance.

Each front and rear auxiliary module 20 and 30 are made to provide a plurality of elongated front and rear skid rails 27 and 37, one end of the rails are adapted to have fixed to each front and rear cross beams 26 and 36, and another end of the rails slide over on each main cross beam 16 and rests thereon.

Each front and rear skid rails 27 and 37 is located between a main skid rail 17 and is adjacent the side frames 11, and horizontally spaced at a desired distance.

Each main skid rails 17 and front said rails 27 and rear skid rails 37 are provided with a plurality of roller means having low friction flow capability which permit the articles M to be conveyed forwardly thereon.

In the preferred embodiment, the front and rear cross beams 26 and 36 are located along bent section of the front and rear skid rails 27 and 37, respectively.

Main connector 48 having a saddle and a top section 48a and 48b facilitate the connection of the front cross beam 16 and the terminal end of the main skid rail 17 as shown in FIGS. 5 and 6.

Front and rear connector 52 and 53 having a top, an intermediate and a bottom section 52a, 52b, 52c and 53a, 53b, 53c facilitate the connection of the front and rear cross beams 26 and 36, and the terminal ends of the front and rear skid rails 27 and 37 as same shown in FIGS. 5 and 6.

In this manner, the rack module 50 is adapted for being stacked and dispensing a plurality of articles M thereon. Each front and rear cross beams 26 and 36 is adapted for securely holding the articles M against falling from the front and rear auxiliary modules 20 and 30.

Each main, front and rear cross beams 16 and 26 and 36 in this embodiment are composed of large and small external diameter pipes, respectively, with the large diameter pipes serving to allow insertion and sliding of small diameter pipes.

Thus, for instance, each main, front and rear cross beams 16 and 26 and 36 illustrated with dotted lines in FIGS. 2 and 3, is capable of a variation of an effective length thereof, and further capable of a variation of an effective width of the rack module 50.

The rack apparatus 100 takes the general form of a multi-stages structure, that is, it is capable of a sufficient structural integrity of multi-stages combination of the rack module 50 that they are same shape and size.

In the preferred embodiment of the rack apparatus 100 in order to facilitate the form of multi-stages structure of the rack module 50, the rack module 50 is provided with a joint member 46, H-shaped like, which is positioned longitudinally between a plurality of main modules 10 in a vertical relation.

Figure 8:
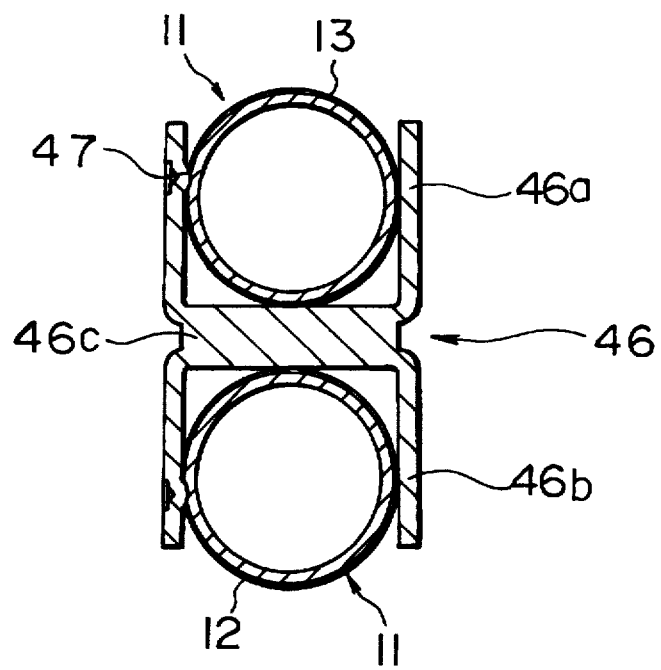
FIG. 8 is an enlarged cross sectional view of a H-shaped joint of the present invention taken along line VIII—VIII of FIG. 1.
Figure 9:
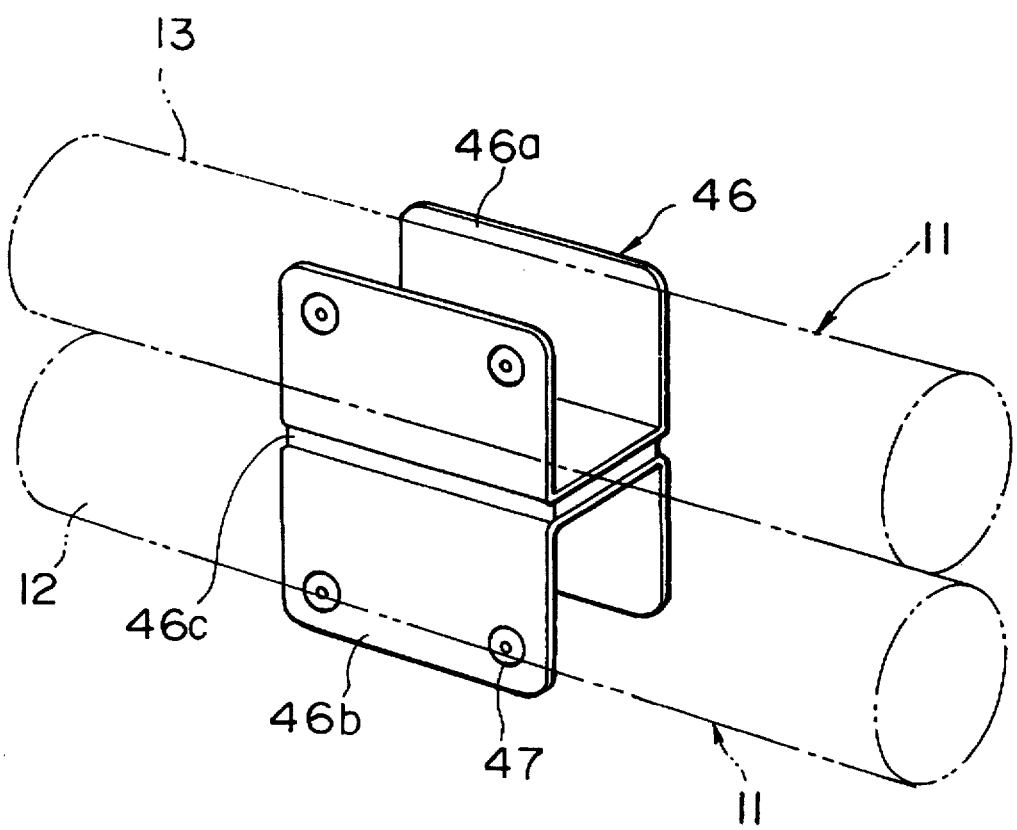
FIG. 9 is an enlarged fragmentary perspective view of a H-shaped joint of FIG. 8.

Referring to FIGS. 8 and 9, the joint member 46 is formed of an upper and lower section 46a and 46b, respectively and an intermediate section 46c between above sections 46a and 46b. Additionally, each of upper and lower section 46a and 46b is provided with at least one projection 47 inside thereof, which engages with the outer surfaces of the upper and lower sections 12 and 13 of the side frame 11, respectively.

Each projection 47 is suitably placed slightly apart from center lines of the upper and lower sections 12 and 13, and securely snap-on engages with the outer surface thereof.

In this way, it is possible for assembly the multi-stage structures of the rack modules 50, and allows easily changing to any suitable number of rack modules 50 in vertical position.

Furthermore, as described previously there is a capability of adjustable change of the effective length and width of the rack modules 50, as suits the needs of the user.

Referring to FIGS., 1 and 3, in the preferred embodiment, the support members 55 and 56 for supporting the rack apparatus 100 is provided with mount pads 57 and 58 at the bottom position of the rack apparatus 100.

The respective caster units 59 and 60 as a facilitator of a movement of the rack apparatus 100 are dismountably attached to said mount pads 57 and 58.

Each of the mount pads 57 and 58 may preferably be sized to have a thickness so that the thickness of mount pad 57 is slightly thinner than the thickness of the mount pad 58.

In this way, it is possible for supporting of the rack apparatus 100 in the forwardly inclined position at inclinations of approximately two degrees (2°).

Figure 10:
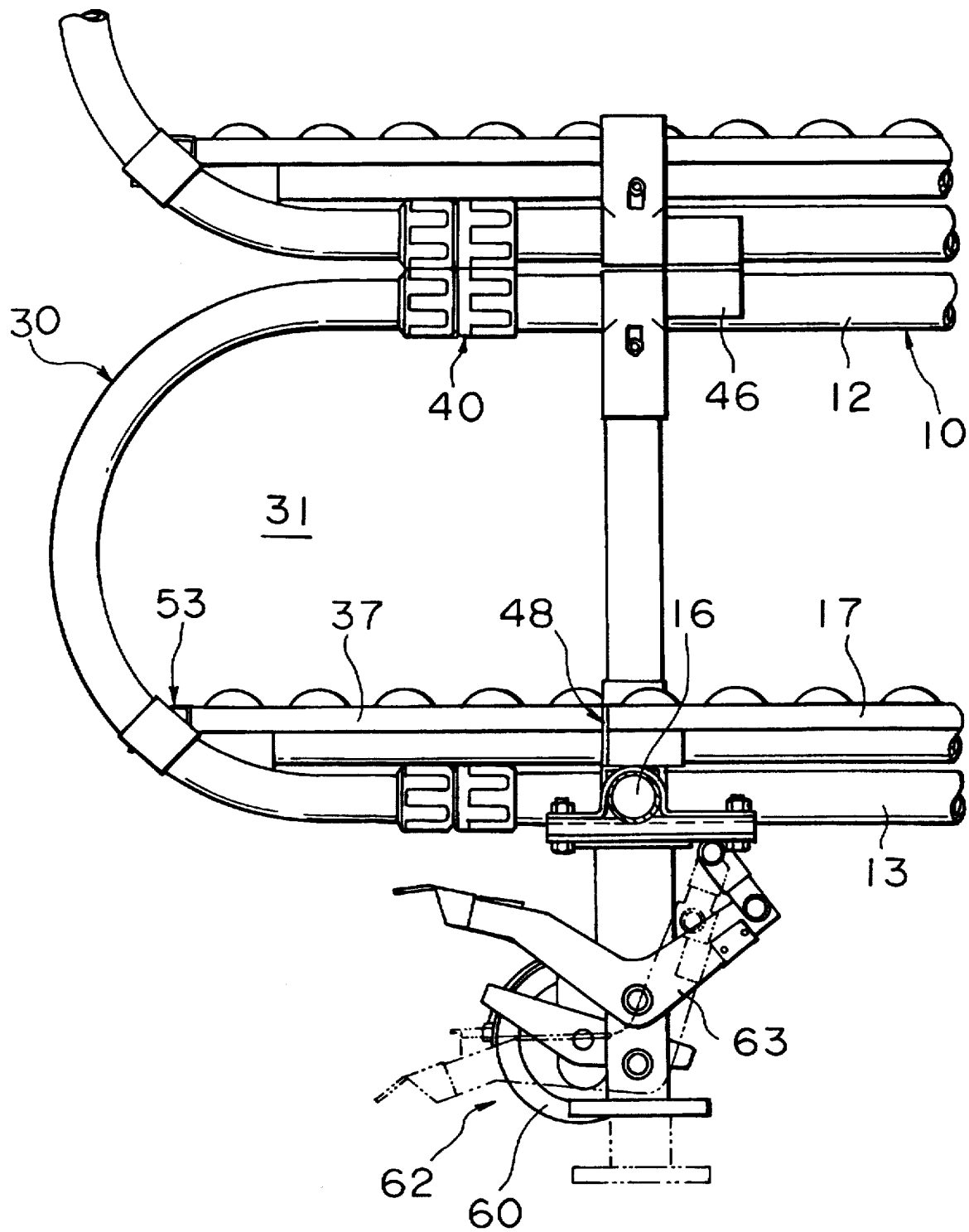
FIG. 10 is an enlarged fragmentary side elevational view of the present invention taken along line X—X of FIG. 3.
Figure 11:
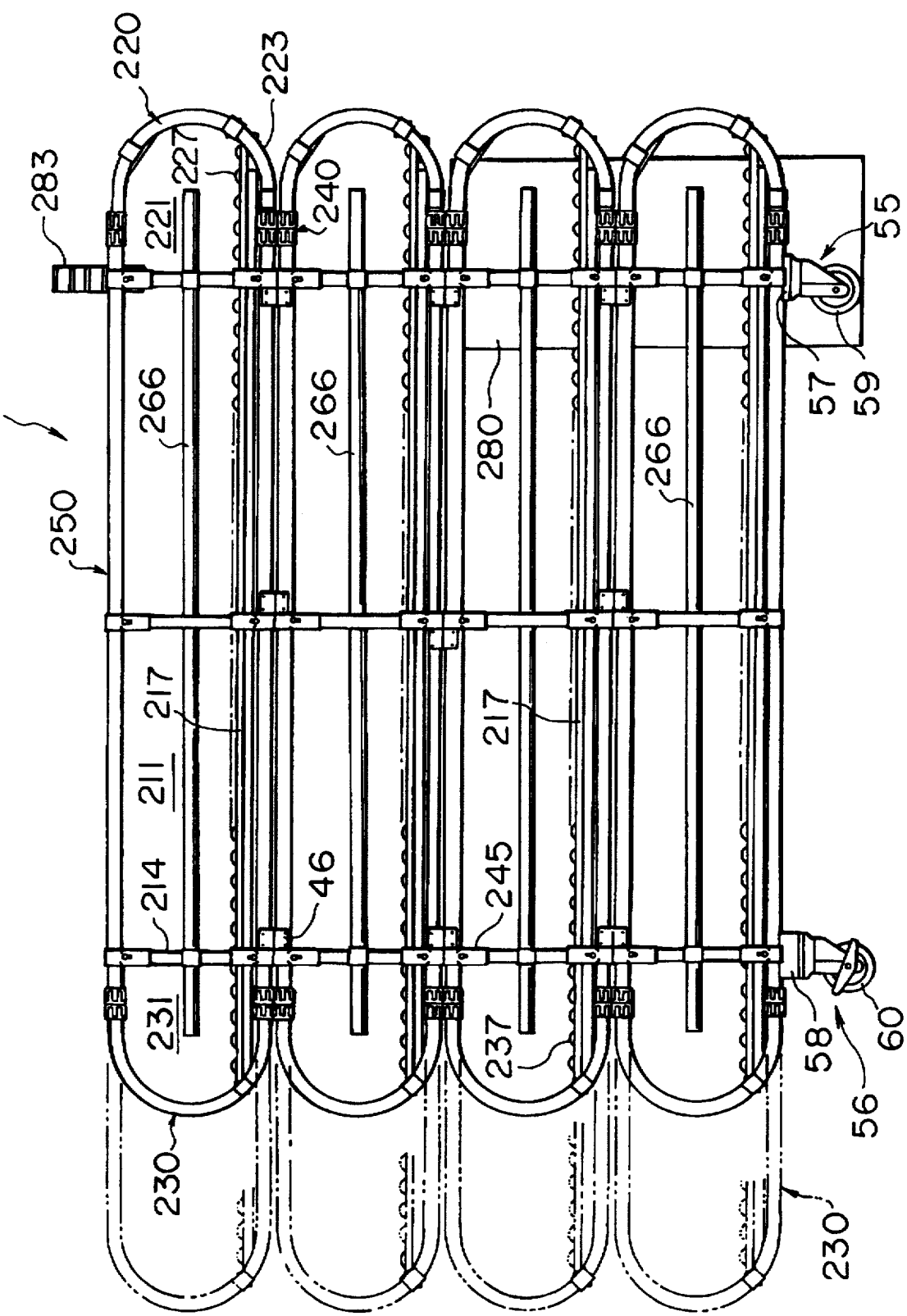
FIG. 11 is a side elevational view of a gravity feed flow-rack apparatus showing an alterative embodiment of the present invention.
Figure 12:
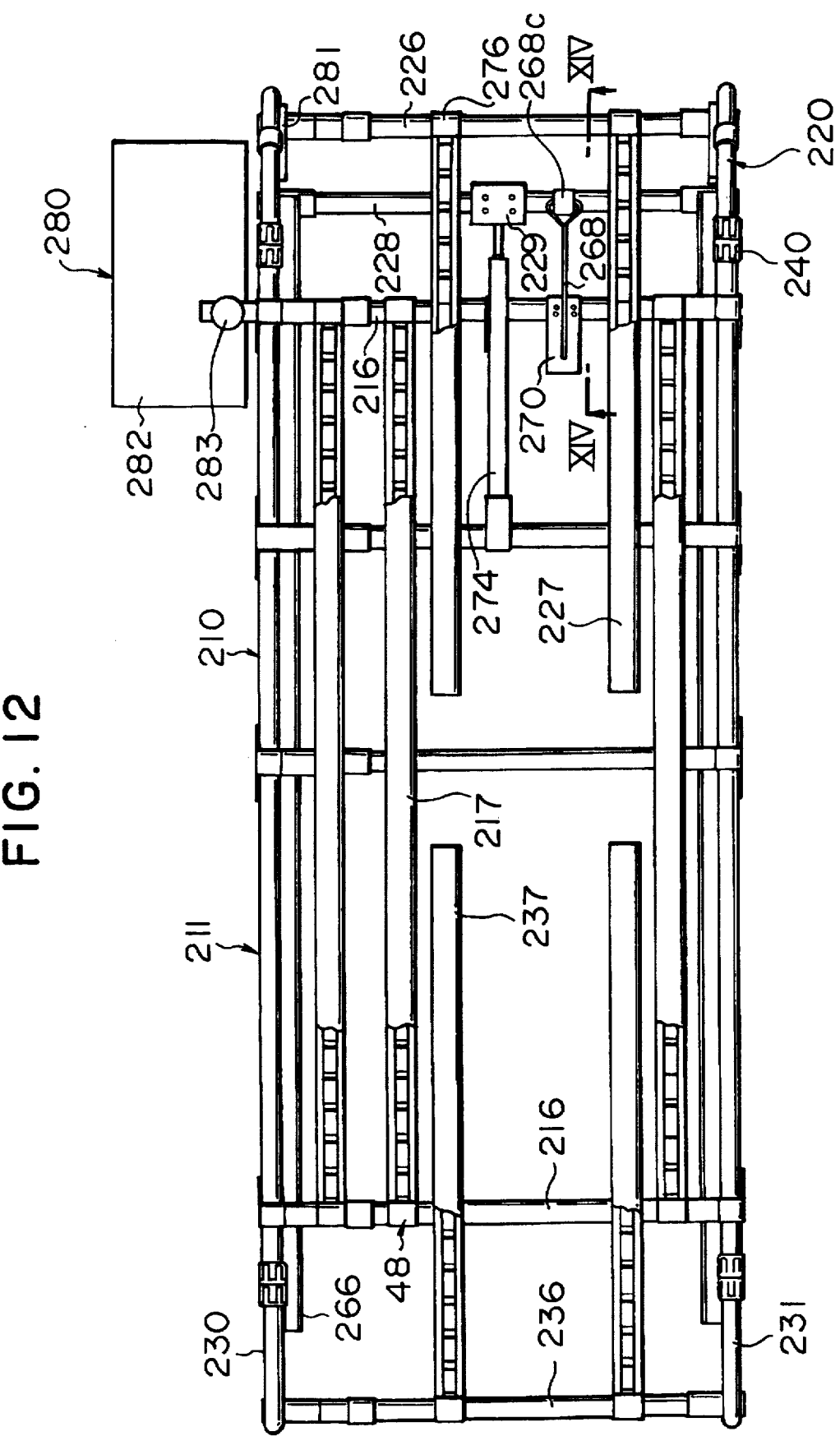
FIG. 12 is a top plan view of the same of FIG. 11.
Figure 13:
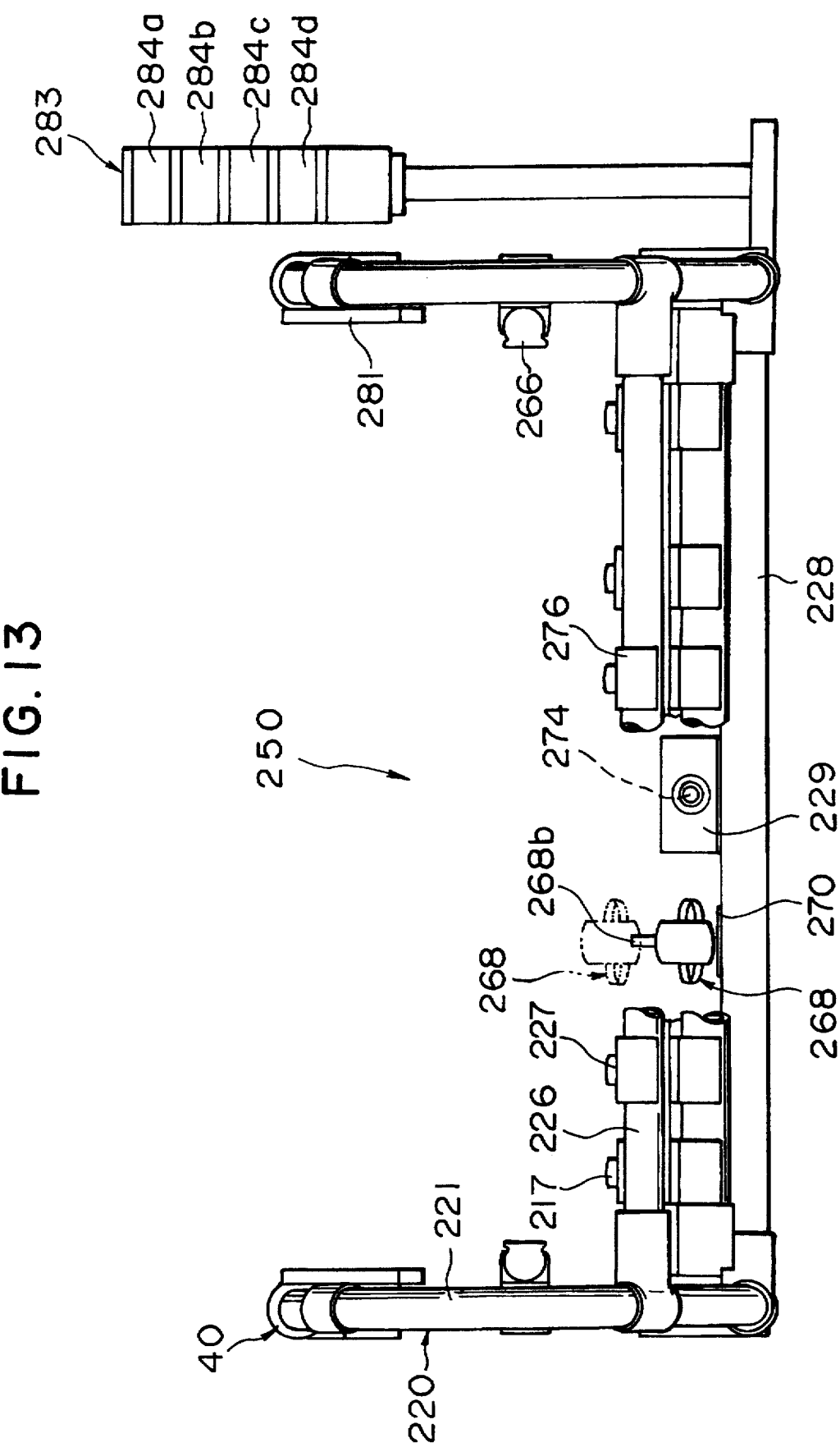
FIG. 13 is a fragmentary, front elevational view of FIG. 11, illustrating the front portion of the same.
Figure 14:
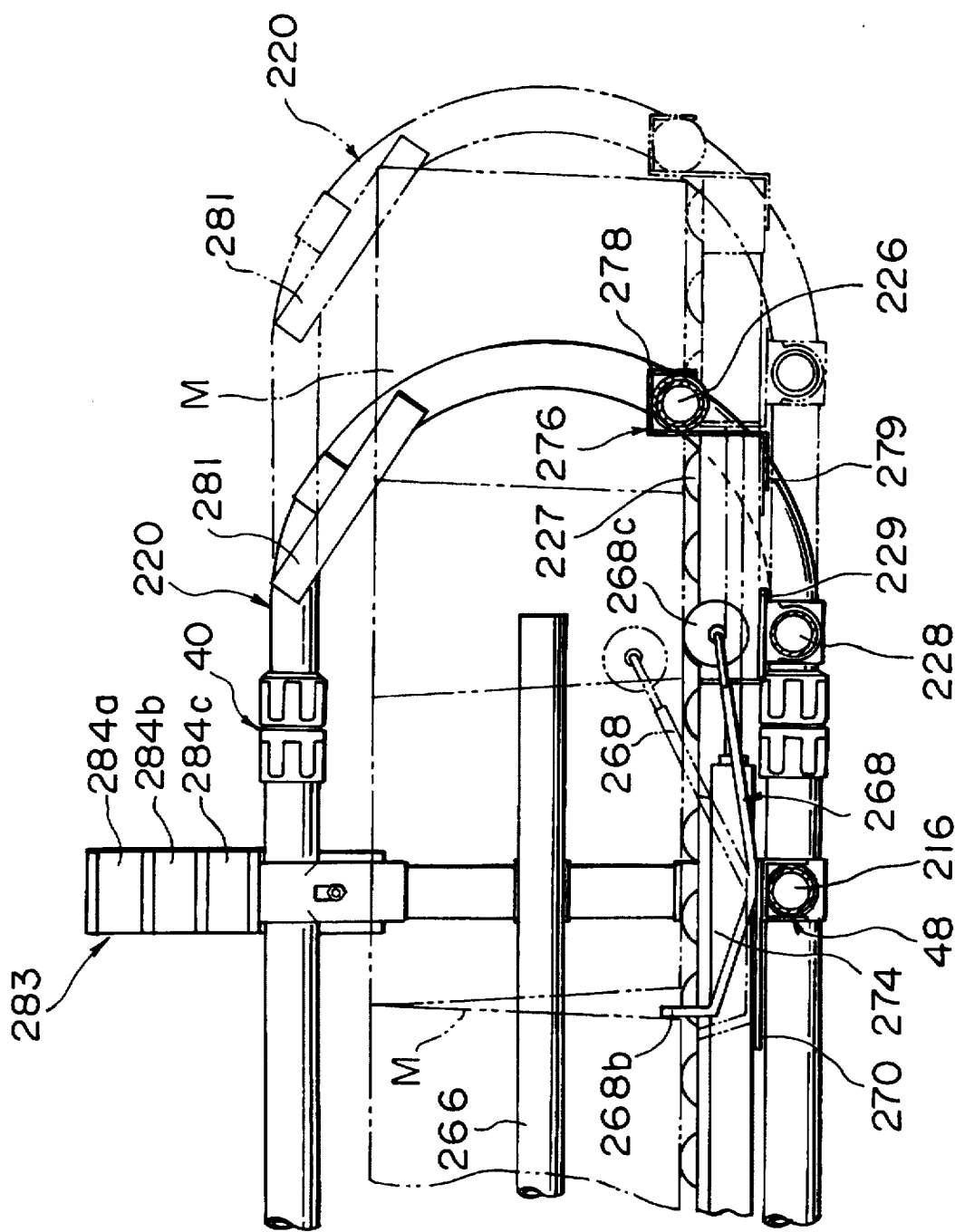
FIG. 14 is an enlarged fragmentary side elevational view of the present invention taken along line XIV—XIV of FIG. 12.

As shown in FIGS. 3, and 10, also movable support member 62 are provided adjacent to the support members 56, which comprises the caster unit 60 having a floor jack 63 (made by Hammer Caster Co., HAMMER ROCK 900-2) so designed that the ram thereof extended below the caster unit 60.

In a similarly way, it is possible for supporting of the rack apparatus 100 in the inclined forwardly position through which the movable support members 62 can be applied, if necessary, and is capable at inclination of approximately four or five degrees (4° and 5°), and desired inclination of the rack apparatus 100.

Preparation and operation of the rack apparatus 100 is as follows:

When desired rack module 50 is utilized for loading of articles M, it is desirable to loosen the insert joint 40 on the rear auxiliary module 30. Thereafter, the rear auxiliary module 30 can be retracted manually and outwardly from the main module 10 end, and positioned at a desired length thereof so that an operator can replenish for loading of articles M.

Also, each main, front and rear cross beams 16 and 26 and 36 may be manually slid transversely, if necessary, and be positioned at a desired width, so that an operator can replenish the loading of the articles M having the specified width thereof.

Conveyance of the articles M on the rack apparatus 100 is as follows. The loaded articles M on the rear auxiliary module 30 is permitted to slide forwardly on sequential arranged rear and main and front skid rails 37 and 17 and 27 under the influence of gravity whereby rack apparatus 100 is inclined forwardly, and the conveyance of the articles M continues until the front cross beams 26 at the front auxiliary module 20.

Thereafter, the rear auxiliary module 30 is manually and inwardly inserted into the main module 10, and the insert joint 40 is secured.

The above operation of the preparation and conveyance of the multiple articles M on desired rack modules 50 may be applied in similar way to another rack modules 50. Also, the rack apparatus 100 may be of any suitable dimension to permit efficient storage and handling of a large number of the articles M.

Further, it may not be necessary to loosen and secure the insert joint 40 in every operation, because of a frictional force between the main and rear auxiliary module 10 and 30 which permits an effective fitting of each module 10 and 30.

Operation of the article M dispensing from the rack apparatus 100 is as follows.

The insert joint 40 on the front auxiliary module 20 is desirable to be loosen as the rear auxiliary module 30 is held in the font cross beam 25 and serially conveyed articles M are held by first-in articles M, where up they stop and are stored.

Thus, article M may be stored in each rack module 50 and dispensed onto a next usage by manual operation in a first-in, first-out order.

Referring to FIGS. 11–14, an alternative embodiment of the rack apparatus is shown and generally referred to by the number 200. The rack apparatus 200 comprises a rack module 250 similar to the rack module 50 described previously, except that it is has a guide way 266 made of plastic resins, which are at least in part, a column section 214 of a side frame 211 of the rack module 250, and a front cross beam 228 that is provided with the front cross beam 226 in parallel relation to the front of auxiliary module 220, thus allowing it to be a conveyance of the articles M on the rack module 250.

Each main cross beam 216 is provided with a tiltable stopper 268 pivotally connected by a pin (not shown) with a support plate 270 of the main cross beam 2116.

Each tiltable stopper 268 is formed of a stopper end 268b at one end and a rotable roller end 268c at another end, balanced on the pin support which is provided with a torsion spring or balance wight (not shown) and is so designed as to allow it to operate at an oppositely and tiltable movement of both ends 268b and 268c, namely, a see-saw that rises and falls in turn.

The tiltable stopper 268 is actuated by loading of an article M thereon, which is located at the front of auxiliary module 220, Roller end 268C is falls by a contact of the article M bottom surface and the stopper end 268b rises in turn.

In this position, the stopper end 268b having an upwardly bent front stop, preferably makes contact with the following other articles side surface to prevent any unwanted engagement with a first-in article M.

If first-in articles M, at the front auxiliary modules 220, is dispensed manually from the rack module 250, the stopper end 268b will falls to the underside of the main skid rail 217 under force of twisting of the torsion spring on the pin, the following subsequent article is automatically advance forwardly and serially to the front auxiliary module 220.

In the preferred embodiment, a hydraulic power cylinder 274 extending longitudinally is provided between the main and a second front cross beam 216 and 228.

A front connector 229 is in the form of a right angled plate which is bent to define side and lower sections.

The side section of the front connector 229 is combined with a piston rod end of the power cylinder 274 and the lower section is secured such as by welding to the front cross beam 226.

Thus, the front auxiliary module 220 may be automatically slid outwardly and inwardly with an actuation of the power cylinder 274.

Also, a second front connector 276 having a saddle and a right angled section 278 and 279 facilitates the connection of the front cross beam 226 and end of the front skid rails 227 as shown in FIGS. 12–24.

The rack apparatus 200 provided with an automatic control means 280 for controlling a slide operation of the front auxiliary module 220.

The control system 280 includes a sensor means 281, a control unit 282, a hydraulic cylinder 274 and display unit 283.

The article M and other operation condition at the front auxiliary module 220 are monitored by a pair of sensor means 281 which is provided at a corner portion of the module 220.

The sensor means 281 may be such as an optical, line sensor and others.

The sensor means 281 is connected electrically to the control unit 282 having electronic circuit therein for programmed control of the front auxiliary module 220 operation. The control unit 282 is also connected to the hydraulic power cylinder 274 which actuates the slide operation of the front auxiliary module 220.

A limit switch (not shown) is installed at the front auxiliary module 220 for a detection of the articles M loaded thereon.

The display unit 283 is provided with plurality of colored signal lamps in the color of green, orange, red and 284a, 284b, 284c and 284d to allow displaying an user of the operating state of the rack apparatus 200, and remotely activated control unit 282.

Operation of a preparation of the rack apparatus 200 is as similar to previous described rack apparatus 100 as follows.

There ear auxiliary module 230 manually an outwardly slides from the main module 210 end, and positioned to a desirable length thereof so that an operator can replenish the loading of articles M. Operation of a conveyance of the articles M on the rack apparatus 200 is as follows.

In the rack module 250, the load articles M on the rear auxiliary module 230 is permitted to slide forwardly on sequential arranged rear and main and front skid rails 237 and 217 and 227 under the influence of gravity whereby rack apparatus 200 is inclined forwardly, with the articles M continue sliding to the front cross beams 226 at the front auxiliary module 220.

Thereafter, the rear auxiliary module 230 manually and inwardly slides into the main module 210, and the insert joint 240 is secured, thus allowing it to be ready for a next operation.

Above operations of the preparation and conveyance of the multiple articles M on the rack apparatus 200 may be applied in similar way to another rack modules 250. Also, the rack apparatus 200 may be of any suitable dimension to permit efficient storage and handling of a large number of articles M.

The loaded article M on the rear auxiliary module 230 is sensed by the limit switch and the lit green lamp 284a which informed of loading of the article M and then causing the control unit 282 to permit the outwardly slide movement of the power cylinder 274; and then the orange lamp 248b is lit which informs of the slide operation of the front auxiliary module 220 where the article M is loaded. As previously described, the tiltable stopper 268 is actuated by loading of the article M thereon, roller end 268c falls by a contact of the article M bottom surface and the stopper end 268b rises in turn, and prevents the advance of a following article to the first-in article. At the article M dispensing, where the article M is removed from the front auxiliary module 220, and sensed by the sensor means 281 which then causes the control unit 282 to permit the return slide movement of the power cylinder 274 that retracts movement of the front auxiliary module 220, and the green lamp 284a lights which informs of a permissible loading of the article M on the rear auxiliary module 230.

However, when the article M abnormally remains at the dispensing position, the article M is sensed by the sensor means 281 and then causes the control unit 282 to allow stopping of the operation of the rack apparatus 200 including the power cylinder 274 and an associated work line and the red lamp 284c lights which informs of the remained article M at the dispensing position at timed intervals.

Also, when the article M is not loaded at the rear auxiliary module 230, non-loaded article M is sensed by the limit switch and causes control unit 282 to allow a stoppage of the operation of the rack apparatus 200 including the power cylinder 274 and associated work line and the red lamp 284d which is informs of the non-loaded M on the rear auxiliary module 230 is lightened.

Further, operation of the conveyance and prevention of the article on the rack apparatus 200 as described above is not described for brevity's sake.

Various modifications should not be readily apparent.

In first modification is by the combination of different heights of the rack modules 50 and 250, the entire structure having 200 mm, 300 mm, 400 mm, 500 mm in height thereof is greatly performed of being stacked and dispensed the article M in different sizes.

In second modification, by providing the structure of the insert joint 40 at the main, front, and rear cross beams 16, 26 and 36, and alternatively at the front cross beams 226, the entire structure is greatly extended in the configuration.

In view of the foregoing, the many advantages and novel features of the invention should be readily apparent.

The present invention, is well adapted by the rack apparatuses 100, 200 to be flexible by combination of the rack modules, thereby effectively utilizing the rack space and enhancing the articles storage and operation efficiency, and permitting suitable inclination, and constant flow rate in spite of a differences in flow properties for conveying the articles.

Also, the rack apparatus 100, 200 may be flexibly arranged in width dimension and a number of the rack modules 50, 250, thereby extendingly effectively utilizing the rack space and enhancing the articles storage and operation efficiency.

The components of the rack modules 50, 250 permits the safety in the operation of the articles loading and dispensing, and keep up attractive in appearance thereof. It permits automatically advancing the articles M and controlling the adjustability of the rack modules 50, 250.

By the tiltable stopper 268 of the rack modules 50, 250 in which operates see-saw like, the following articles advance to first-in articles can be prevented and results performing the construction is greatly simplified and cost reduced by the elimination of the need for the stopper means and link arm lifting of the conventional rack apparatus.

The front auxiliary modules 220 has a slide movement by automatic means for obtaining of desired article dispensing in an effective workability.

While the present invention has been in detail with regards to the preferred embodiments, it is appreciated that other variation of the present invention may be devised which do not depart from the inventive concept of the present invention.

What is claimed is:

1. A gravity-feed flow-rack apparatus for multiple articles, comprising:
   (a) a plurality of rack modules disposed in generally vertical multi-stage relation, each of said rack modules comprising;
      (1) a main module comprising a pair of side frames, said side frames having an upper and a lower section and a column section interposed between said upper and lower section, and having a plurality of main cross beams transversely disposed between said side frames;
      (2) a front auxiliary module comprising a pair of front side frames, said front side frames having ends capable of being inserted into said upper and lower sections of said main modules, and having front cross beams transversely disposed between said front side frames;
      (3) a rear auxiliary module comprising a pair of rear side frames, said rear side frames having ends capable of being inserted into said upper and lower sections of said main modules, and having rear cross beams transversely disposed between said rear side frames;
   (b) article conveyance main skid rails having a plurality of rollers extending substantially the entire length of said main module and in generally parallel relation with said pair of side frames, and front and rear skid rails having a plurality of rollers extending substantially the length between said front auxiliary and main modules, and extending substantially the length between said rear auxiliary and main modules; and
   (c) rack support member is interconnected respectively with said rack modules in a lowest relation with said rack modules in a downwardly and forwardly inclined position.

2. The rack apparatus of claim 1 in which said tiltable stopper means for serially advancing said articles being adapted for advance prevention of following articles following first-in articles, comprises a stopper end at one end and a rotable roller end at other end, each end balanced on a pin support, capable of see-saw like operation actuated by loading or dispensing of the first-in articles onto said rack modules.

3. The rack apparatus of claim 1 in which said control means includes a limit switch operatively connected to said control means, said control means for detecting the loading of articles onto said rack modules.

4. The rack apparatus of claim 1 in which said control means includes a sensor means for monitoring dispensing articles onto said rack modules.

5. The rack apparatus of claim 1 in which said control means include a display unit for guidance and indication of said articles operation onto said rack modules, said display unit includes signal lamps.

6. A gravity-feed flow-rack apparatus for multiple articles, comprising;
   (a) a plurality of rack modules disposed in generally vertical multi-stage relation, each of said rack modules comprising;
      (1) a main module comprising a pair of side frames, said side frames having an upper and a lower section and a column section interposed between said upper and lower section, and having a plurality of main cross beams transversely disposed between said side frames;
      (2) a front auxiliary module comprising a pair of front side frames, said front side frames having ends capable of being inserted into said upper and lower sections of said main modules, and having a front cross beam transversely disposed between said front side frames;
      (3) a rear auxiliary module comprising a pair of rear side frames, said rear side frames having ends capable of being inserted into said upper and lower sections of said main modules, and having rear cross beams transversely disposed between said rear side frames;
   (b) article conveyance main skid rails having a plurality of rollers extending substantially the entire length of said main module and in generally parallel relation with said pair of side frames, and front and rear skid rails having a plurality of rollers extending substantially the length between said front auxiliary and main modules, and extending substantially the length between said rear auxiliary and main modules; and
   (c) rack support member is interconnected respectively with said rack modules in a downwardly and forwardly inclined position.
   (d) a tiltable stopper means for serially advancing said articles mounted on said main module; and (e) a control means for controlling actuation of a hydraulic power cylinder, said hydraulic power cylinder actuates sliding of said auxiliary modules being mounted extendingly longitudinally on said main module.

7. The rack apparatus of claim 1 or 6 in which said rack modules are capable of interconnecting for vertical multistage relation using a joint member.

8. The rack apparatus of claim 1 or 6 including an insert joint for joining said main module and front and rear auxiliary modules, said insert joint being joined when said front and rear auxiliary modules are inserted telescopically into said main module.

9. The rack apparatus of claim 1 or 6 in which the main skid rail ends of said article conveyance skid rails are fixed on said main cross beams.

10. The rack apparatus of claim 1 or 6 in which one end of said front skid rail being fixed on said front cross beam and the other end of said front cross beam and the other end of said front skid rail rests to slide over on said main cross beam.

11. The rack apparatus of claim 1 or 6 in which one end of said rear skid rail is fixed on said rear cross beam and other end of said rear skid rail rests to slide over on said main cross beam.

12. The rack apparatus of claim 1 or 6 in which said main and front and rear cross beams are adapted for length variation thereof which is capable of width variation of said rack modules.

13. The rack appratus of claim 1 or 6 in which said support member is height adjustable.

14. The rack apparatus of claim 13 in which said rack apparatus being adapted to positioned at a desired angle of inclination.

15. The rack apparatus of claim 1 or 6 in which said front and rear auxiliary modules include said front and rear side frames being formed of U-shaped bent pipes.

* * * * *